United States Patent
Pappone

(10) Patent No.: US 7,191,108 B2
(45) Date of Patent: Mar. 13, 2007

(54) STRUCTURED APPROACH FOR RISK-INFORMING DETERMINISTIC SAFETY ANALYSES

(75) Inventor: Daniel Pappone, San Jose, CA (US)

(73) Assignee: General Electric Company, Schenectady, NY (US)

( * ) Notice: Subject to any disclaimer, the term of this patent is extended or adjusted under 35 U.S.C. 154(b) by 768 days.

(21) Appl. No.: 10/064,191

(22) Filed: Jun. 20, 2002

(65) Prior Publication Data

US 2003/0235264 A1  Dec. 25, 2003

(51) Int. Cl.
G06G 7/48 (2006.01)
G21C 21/00 (2006.01)
G21C 17/00 (2006.01)

(52) U.S. Cl. .................. 703/6; 703/2; 703/7; 376/249; 376/250; 702/185

(58) Field of Classification Search ............ 703/2, 703/6, 7; 376/370, 249, 250; 702/185
See application file for complete search history.

(56) References Cited

U.S. PATENT DOCUMENTS

| | | | |
|---|---|---|---|
| 4,632,802 A * | 12/1986 | Herbst et al. ............ | 376/216 |
| 5,970,437 A * | 10/1999 | Gorman et al. ......... | 702/184 |
| 6,697,447 B1 * | 2/2004 | Casillas et al. ......... | 376/245 |
| 6,772,128 B2 * | 8/2004 | Radigan .................. | 705/4 |
| 6,785,636 B1 * | 8/2004 | Darken et al. .......... | 702/185 |
| 6,799,124 B2 * | 9/2004 | Perdue et al. ........... | 702/34 |
| 2002/0031200 A1 * | 3/2002 | Metell ..................... | 376/370 |
| 2004/0013220 A1 * | 1/2004 | Casillas et al. ......... | 376/245 |

OTHER PUBLICATIONS

Official Transcript of Proceedings, U.S. Nuclear Regulatory Commission, Apr. 12, 2002. http://www.nrc.gov/reading-rm/doc-collections/acrs/tr/fullcommittee/2002/ac020412.html.*
Miller, D.W. et. al. "Dynamic Safety in BWR Plant Safety Systems." IEEE Transactions on Nuclear Science. Aug. 1995, vol. 42, Issue 4, pp. 975-981.*
Turso, J.A. et al. "Kalman Filter-Based Maximum A Posteriori Probability Detection of Boiling Water Reactor Stability". IEEE Transactions on Control Systems Stability. Sep. 2004. vol. 12, Issue 5, pp. 750-756.*
Youngborg, L.H. "Retrofits to BWR Safety and Non-Safety Systems Using Digital Technology." IEEE Nuclear Science Symposium and Med. Imaging Conf. Oct. 31, 1992. vol. 2, pp. 724-726.*

(Continued)

Primary Examiner—Paul Rodriguez
Assistant Examiner—Ayal Sharon
(74) Attorney, Agent, or Firm—Armstrong Teasdale LLP

(57) ABSTRACT

A risk-informed method for safety analyses of nuclear power generating systems is provided. In an exemplary embodiment, the method includes ordering events by an initiating event frequency, defining an initiating event frequency threshold value, defining acceptance criteria having an adjusted amount of conservatism, where the amount of conservatism is a function of the initiating event frequency, and analyzing an event by a deterministic safety analysis methodology when the event has an event initiating frequency at or above the threshold value, or analyzing an event by a probabilistic risk assessment methodology when the event has an event initiating frequency below the threshold value.

15 Claims, 7 Drawing Sheets

OTHER PUBLICATIONS

Ross, M.A. et al. "Control Room Design and Automation in the Advanced BWR." IEEE Nuclear Science Symposium. Oct. 22-27, 1990. pp. 954-960.*

Taggart Rogers, S. et al. "Automated Production and Maintenance of BWR Emergency Operation Procedures." IEEE 5th Conf. on Human Factors and Power Plants. Jun. 11, 1992. pp. 160-166.*

Andersen, V.M. et al. "Human Error Probability Models in the BWR Individual Plant Evaluation Model." IEEE 4th Conf. on Human Factors and Power Plants. Jun. 9, 1988. pp. 323-342.*

Kakehi, A. et al. "Microprocessor-Based Fault-Tolerant Reactor Control and Information System." IEEE Transactions on Energy Conversion. Mar. 1990, vol. 5, Issue 1, pp. 52-57.*

Hucik, S.A. "Advanced Boiling Water Reactor, The Next Generation: Status and Future." IEEE Nuclear Science Symposium and Medical Imaging Conf. Nov. 9, 1991. vol. 2, pp. 1377-1382.*

Fukazaki, T. et al. "Knowledge-Based System for Core Operation Management of Boiling Water Reactors." Proc. of the Int'l Workshop on Artificial Intelligence for Industrial Applications. May 27, 1998. pp. 143-148.*

Kobayashi, Y. et al. "Optimization of Boiling Water Reactor Loading Pattern Using an Improved Genetic Algorithm." Proc. of the 2001 IEEE Int'l Symposium on Intelligent Control. Sep. 2001, pp. 383-390.*

McCalley, J.D. et al. "An Overview of Risk-Based Security Assessment." IEEE Power Engineering Society Summer Meeting. Jul. 1999. vol. 1. pp. 173-178.*

Poulter, Susan. "Monte Carlo Simulation in Environmental Risk Assessment—Science, Policy and Legal Issues." Risk: Health, Safety & Environment. vol. 9, Winter 1998. http://www.piercelaw.edu/risk/vol9/winter/Poulter.pdf.*

Nuclear Energy Institute, "Nuclear Power Plant Regulation." Oct. 2001. http://www.nei.org/documents/Status_Report_Regulation.pdf.*

Gurpinar, A. et al. "Global Blueprints for Change: Living with Natural and Technological Hazards." International Workshop on Disaster Reduction. Aug. 19-22, 2001. http://www.gadr.giees.uncc.edu/DOCS/Theme_A_sent_out/ . . . .*

Framework for Risk-Informed Changes to the Technical Requirements of 10 CFR 50, Aug. 2000, Office Of Nuclear Regulatory Research, Division Of Risk Analysis And Applications, Probabilistic Risk Analysis Branch, pp. i-ii; 1-1 to 1-3; 2-1 to 2-5; 3-1 to 3-7; 4-1 to 4-6; 5-1 to 5-12, 6-1; 7-1; Appendix A, A-1 to A-6.

Framework for Risk-Informed Changes to the Technical Requirements of 10 CFR 50, Dec. 10, 2001, John Gaertner EPRI, pp. 1-4.

* cited by examiner

STRUCTURED APPROACH FOR RISK-INFORMING DETERMINISTIC SAFETY ANALYSES

BACKGROUND OF INVENTION

This invention relates generally to nuclear reactors and more particularly to structured risk-informed deterministic safety analyses for nuclear reactors.

A typical boiling water reactor (BWR) includes a pressure vessel containing a nuclear fuel core immersed in circulating coolant water which removes heat from the nuclear fuel. The water is boiled to generate steam for driving a steam turbine-generator for generating electric power. The steam is then condensed and the water is returned to the pressure vessel in a closed loop system. Piping circuits carry steam to the turbines and carry recirculated water or feed-water back to the pressure vessel that contains the nuclear fuel.

The BWR includes several conventional closed-loop control systems that control various individual operations of the BWR in response to demands. For example a control rod drive control system (CRDCS) controls the position of the control rods within the reactor core and thereby controls the rod density within the core which determines the reactivity therein, and which in turn determines the output power of the reactor core. A recirculation flow control system (RFCS) controls core flow rate, which changes the steam/water relationship in the core and can be used to change the output power of the reactor core. These two control systems work in conjunction with each other to control, at any given point in time, the output power of the reactor core. A turbine control system (TCS) controls steam flow from the BWR to the turbine based on pressure regulation or load demand.

The operation of these systems, as well as other BWR control systems, is controlled utilizing various monitoring parameters of the BWR. Some monitoring parameters include core flow and flow rate affected by the RFCS, reactor system pressure, which is the pressure of the steam discharged from the pressure vessel to the turbine that can be measured at the reactor dome or at the inlet to the turbine, neutron flux or core power, feed water temperature and flow rate, steam flow rate provided to the turbine and various status indications of the BWR systems. Many monitoring parameters are measured directly, while others, such as core thermal power, are calculated using measured parameters. Outputs from the sensors and calculated parameters are input to an emergency protection system to assure safe shutdown of the plant, isolating the reactor from the outside environment if necessary, and preventing the reactor core from overheating during any emergency event.

To operate, nuclear reactor power plants are required to be licensed by the nuclear regulatory body of the country where the nuclear power plant is located. Various postulated transient and accident events are analyzed as part of the nuclear power plant licensing process. Currently, a set of postulated transient and bounding accident events is defined and analyzed using a deterministic safety analysis approach. In the deterministic safety analysis approach, specific analyses are performed using prescribed conservative analytical models and assumptions and the results compared against defined acceptance criteria. Events outside of this set are analyzed using only a probabilistic risk assessment (PRA).

SUMMARY OF INVENTION

In one aspect, a risk-informed method for safety analyses of nuclear power generating systems is provided. The method includes ordering events by an initiating event frequency, defining an initiating event frequency threshold value, defining acceptance criteria having an adjusted amount of conservatism, where the amount of conservatism is a function of the initiating event frequency, and analyzing an event by a deterministic safety analysis methodology when the event has an event initiating frequency at or above the threshold value, or analyzing an event by a probabilistic risk assessment methodology when the event has an event initiating frequency below the threshold value.

In another aspect, a system for performing risk-informed safety analyses of nuclear power generating systems is provided. The includes a computer configured to order events by an initiating event frequency, define an initiating event frequency threshold value, define acceptance criteria having an adjusted amount of conservatism, wherein the amount of conservatism is a function of the initiating event frequency, and analyze an event by a deterministic safety analysis methodology when the event has an event initiating frequency at or above the threshold value, or analyze an event by a probabilistic risk assessment methodology when the event has an event initiating frequency below the threshold value.

In another aspect, a computer program embodied on a computer readable medium for performing risk-informed safety analyses of nuclear power generating systems is provided. The program including a code segment that orders events by an initiating event frequency, defines an initiating event frequency threshold value, defines acceptance criteria having an adjusted amount of conservatism, wherein the amount of conservatism is a function of the initiating event frequency, and analyzes an event by a deterministic safety analysis methodology when the event has an event initiating frequency at or above the threshold value, or analyzes an event by a probabilistic risk assessment methodology when the event has an event initiating frequency below the threshold value.

DETAILED DESCRIPTION

A structured risk-informed method for safety analyses of nuclear power generating systems is described below in more detail. This method risk-informs deterministic nuclear safety analyses. An initiating event frequency is used as the basis for determining if the event is to be analyzed using a deterministic safety analysis methodology or using a probabilistic risk assessment methodology such as that described in Nuclear Regulatory Commission Regulatory Guide 1.174, An Approach for Using Probabilistic Risk Assessment In Risk-informed Decisions On Plant-Specific Changes to the Licensing Basis. The initiating event frequency is then used to further refine the acceptance criteria and methodology used in the deterministic safety analyses. This method can be used for any power generating system deterministic analysis area, for example, transient events and loss-of-coolant accidents. An initiating event is a spontaneous event that causes a reactor abnormality, for example, a broken pipe can result in a loss of coolant in the reactor.

The structured risk-informed method for safety analyses of nuclear power generating systems described below in more detail, in an exemplary embodiment, is web enabled and is run on a business entity's intranet. In a further exemplary embodiment, the method is fully accessed by individuals having authorized access outside the firewall of the business entity through the Internet. In another exemplary embodiment, the method is run in a Windows NT environment or simply on a stand alone computer system having a CPU, memory, and user interfaces. In yet another exemplary embodiment, the method is practiced by simply utilizing spreadsheet software.

Figure 1:
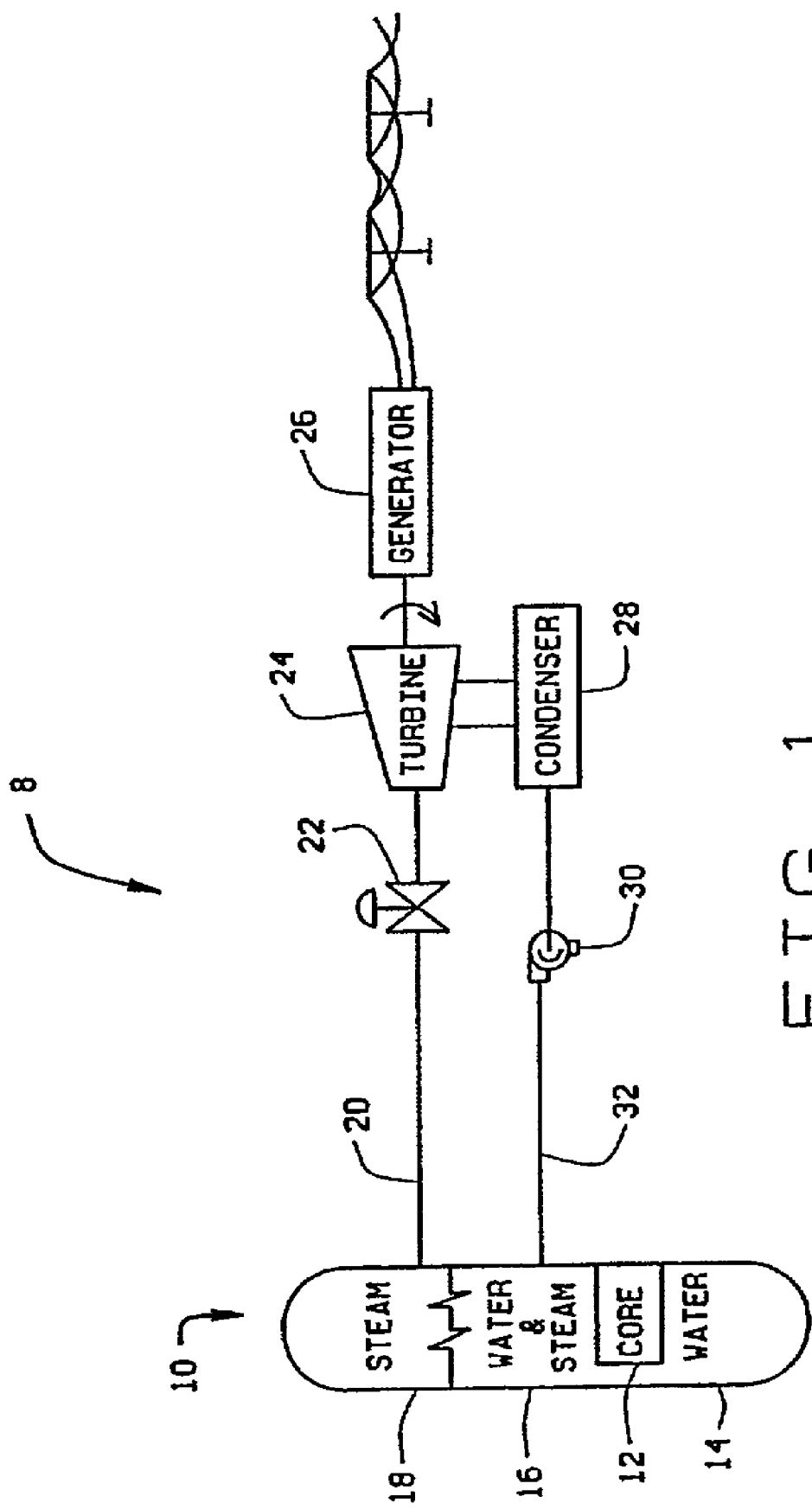
FIG. 1 is a schematic diagram of the basic components of a power generating system that contains a turbine-generator and a boiling water nuclear reactor.

FIG. 1 is a schematic diagram of the basic components of a power generating system 8. The system includes a boiling water nuclear reactor 10 which contains a reactor core 12. Water 14 is boiled using the thermal power of reactor core 12, passing through a water-steam phase 16 to become steam 18. Steam 18 flows through piping in a steam flow path 20 to a turbine flow control valve 22 which controls the amount of steam 18 entering steam turbine 24. Steam 18 is used to drive turbine 24 which in turn drives electric generator 26 creating electric power. Steam 18 flows to a condenser 28 where it is converted back to water 14. Water 14 is pumped by feedwater pump 30 through piping in a feedwater path 32 back to reactor 10.

Figure 2:
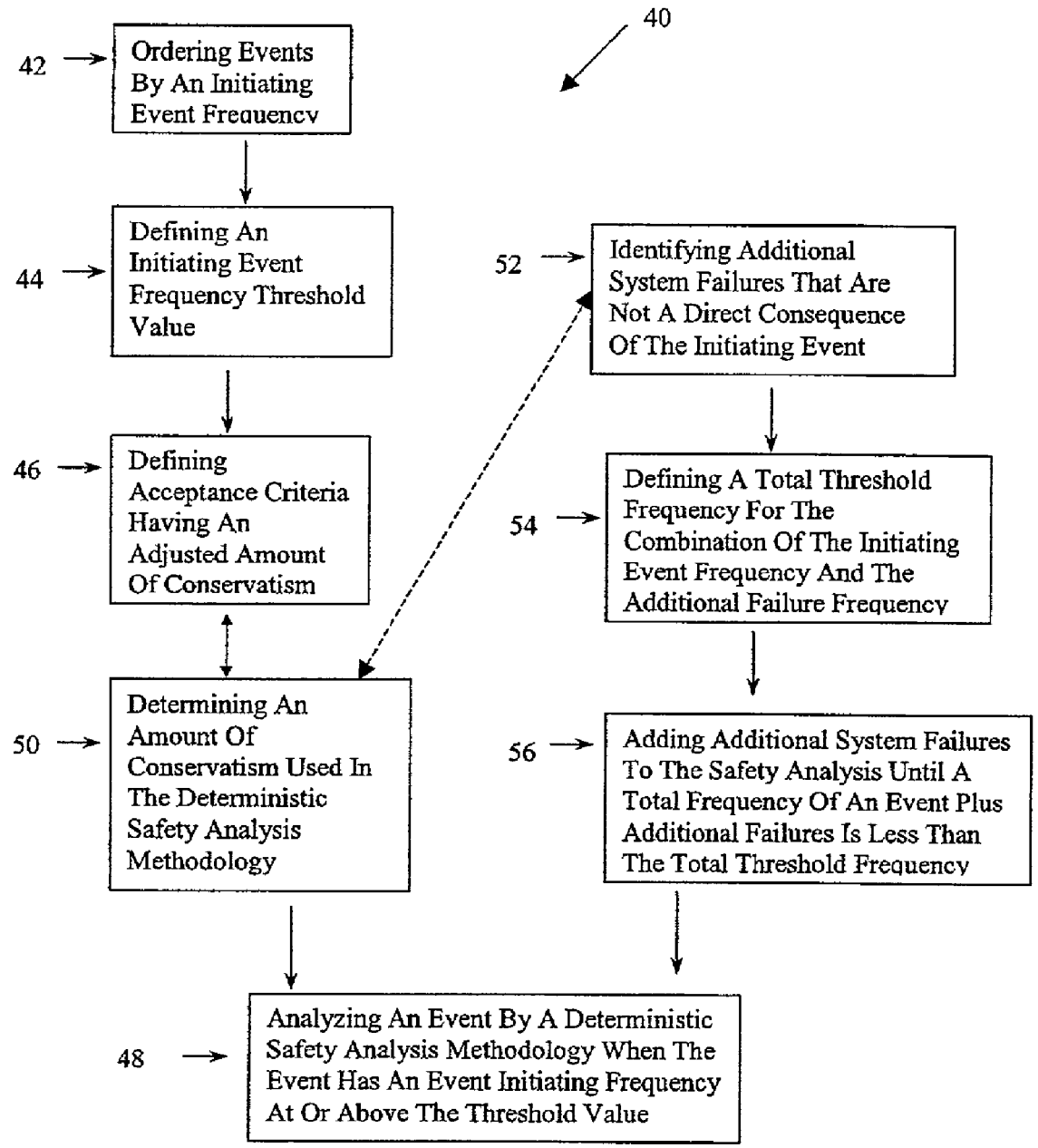
FIG. 2 is a flow chart of a structured risk-informed method for safety analyses of nuclear power generating systems in accordance with an embodiment of the present invention.

FIG. 2 is a flow chart of a structured risk-informed method 40 for safety analyses of nuclear power generating systems 8 in accordance with an embodiment of the present invention. In an exemplary embodiment, risk-informed method 40 includes ordering 42 events by an initiating event frequency, defining 44 an initiating event frequency threshold value, defining 46 acceptance criteria having an adjusted amount of conservatism, where the amount of conservatism is a function of the initiating event frequency, and analyzing 48 an event by a deterministic safety analysis methodology when the event has an event initiating frequency at or above the threshold value. Method 40 also includes determining 50 an amount of conservatism used in the deterministic safety analysis methodology, identifying 52 additional system failures that are not a direct consequence of the initiating event, defining 54 a total threshold frequency for the combination of the initiating event frequency and the additional failure frequency, and adding 56 additional system failures to the safety analysis, one at a time, until a total frequency of an event plus additional failures is less than the total threshold frequency when the initiating event frequency is above the total threshold frequency.

Figure 3:
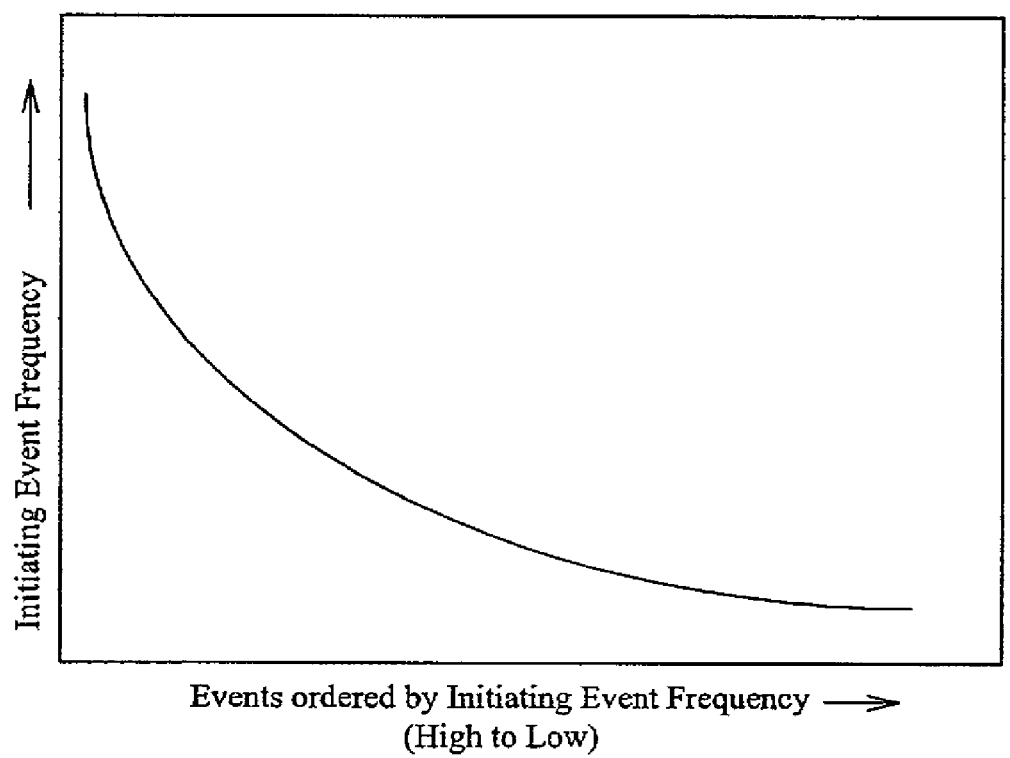
FIG. 3 is a graph of events ordered by an initiating event frequency.

Postulated transient and accident events are categorized in order to determine which events will to be analyzed using a deterministic safety analysis methodology or using PRA methodology. The events are ordered by initiating event frequency from high to low. The event spectrum can be made up from discrete events (for example, generator load rejection, turbine trip) or a continuous spectrum (e.g., assumed pipe break area for a loss-of-coolant accident). FIG. 3 shows an example of initiating events ordered by an initiating event frequency.

Figure 4:
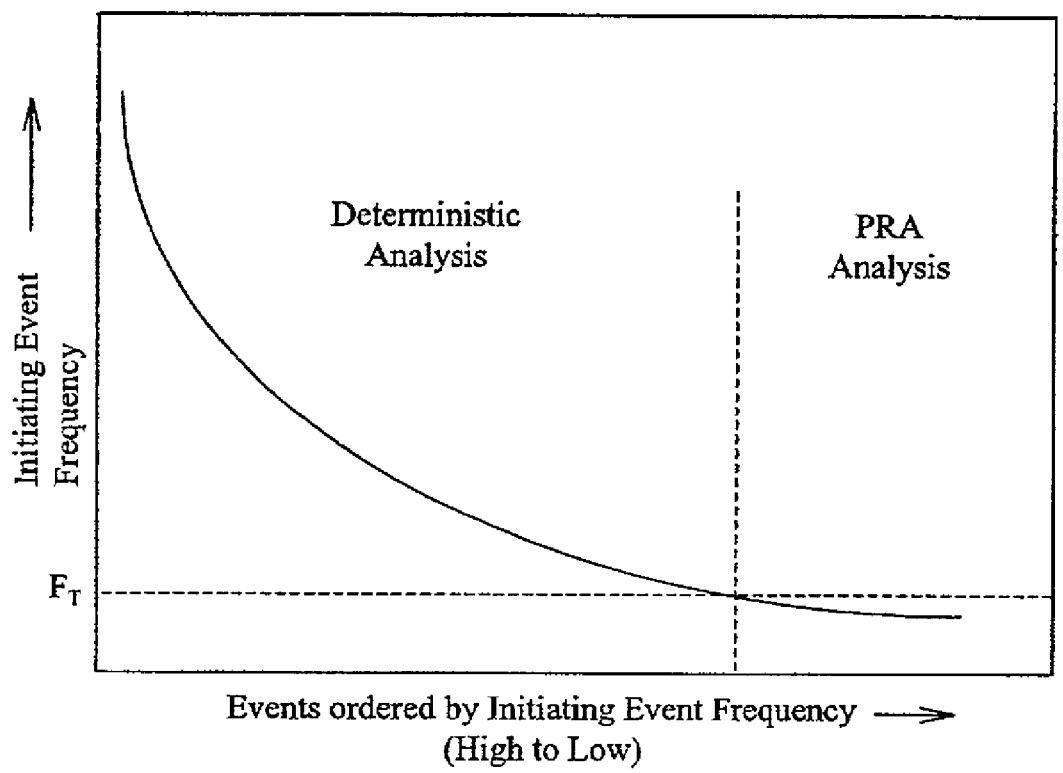
FIG. 4 is a graph of the events ordered by an event initiating frequency and an initiating event frequency threshold value.

Next a threshold value, $F_T$, for the initiating event frequency is defined. Events with initiating frequencies above this threshold value will be analyzed using deterministic safety analysis methodologies. Events with initiating frequencies below this threshold value will be analyzed with only PRA methodologies. Any suitable value can be assigned to $F_T$, for example, in one embodiment, $F_T$ is about $10^{-5}$ to about $10^{-7}$ events per year. In another embodiment, $F_T$ is about $5 \times 10^{-6}$ to $5 \times 10^{-7}$, and in another embodiment, $F_T$, is about $10^{-6}$ events per year. FIG. 4 is a graph showing events ordered by an event initiating frequency and an initiating event frequency threshold value.

Figure 5:
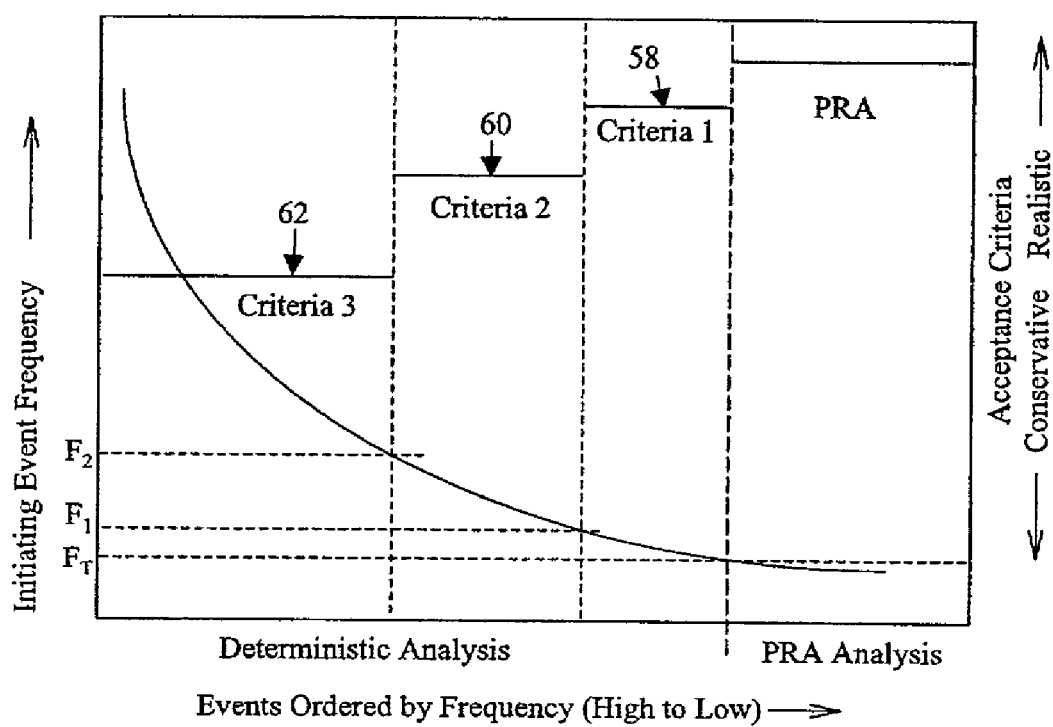
FIG. 5 is a graph of events ordered by an initiating event frequency and showing different acceptance criteria.

The frequency of core damage is used as the figure of merit in PRA methodologies. The acceptance criteria for deterministic safety analyses are typically prescribed by regulations or industry standards and include a conservative margin to core damage. In an exemplary embodiment, using a risk-informed approach, it is possible to determine the appropriate amount of conservatism to be included in the deterministic analysis acceptance criteria. The amount of conservatism required can be defined as a function of the initiating event frequency. As the likelihood of the event increases, the amount of conservatism (or margin to core damage) included in the acceptance criteria is also increased. The mathematical relationship between the initiating event frequency and the amount of conservatism in the acceptance criteria is developed for each application based on a consideration of the relevant phenomena and the controlling parameters. FIG. 5 shows an example using a step change function to define three levels of acceptance criteria. In the example, a first set of acceptance criteria 58 is applied to events having initiating frequencies between $F_T$ and $F_1$. This set of acceptance criteria has the least amount of conservatism. A second set of acceptance criteria 60 is applied to events having initiating frequencies between $F_1$ and $F_2$. Since there is a greater likelihood that events in this group will occur than events in the first group, there is more conservatism included in acceptance criteria 60 for this group than in acceptance criteria 58 of the first group. Similarly, a third set of acceptance criteria 62 is applied to the events having initiating frequencies greater than $F_2$.

Figure 6:
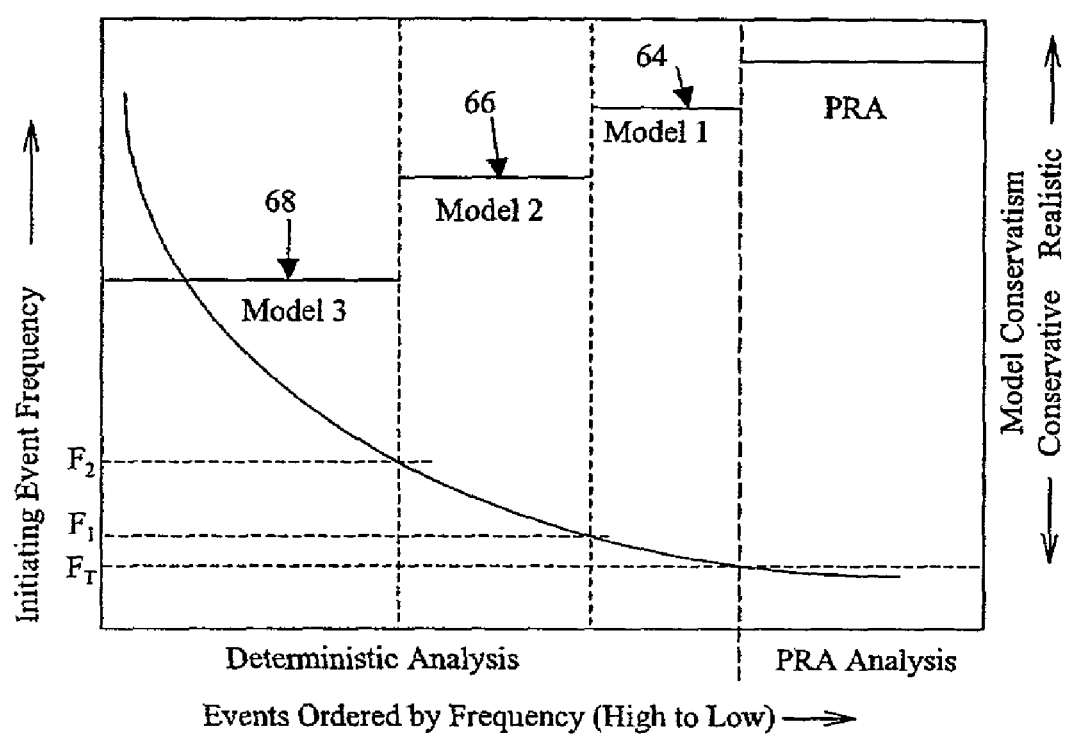
FIG. 6 is a graph of events ordered by an initiating event frequency and showing different analysis methodology conservatism.

In the exemplary embodiment, the conservatism used in the analysis methodology (models, inputs, and assumptions) is risk-informed using the same approach as used for defining the acceptance criteria. PRA analyses use realistic methodologies with no added conservatism. The conservatism included in the methodologies used for deterministic safety analyses is typically prescribed by regulations or industry standards. Using the risk-informed approach of the exemplary embodiment, it is possible to determine the appropriate amount of conservatism to include in the deterministic analysis methodologies. The amount of conservatism required is defined as a function of the initiating event frequency. As the likelihood of the event increases, the amount of conservatism included in the analysis methodology is also increased. The mathematical relationship between the initiating event frequency and the amount of conservatism in the analysis methodology is developed for each application based on a consideration of the available methodologies, relevant phenomena, and the controlling parameters. FIG. 6 shows an example using a step change function to define three levels of methodologies. In the example, a first methodology 64 is applied to events having initiating frequencies between $F_T$ and $F_1$. Methodology 64 has the least amount of conservatism. A second methodology 66 is applied to events having initiating frequencies between $F_1$ and $F_2$. Since there is a greater likelihood that events in this group will occur than events in the first group, there is more conservatism included in methodology 66 applied to this group of events than methodology 64 applied to the first group. In a similar fashion, the most conservative methodology 68 is applied to the events having initiating frequencies greater than $F_2$. In the example shown, the initiating event frequency breakpoints, F1 and F2, are not required to be the same as the breakpoints used to define acceptance criteria regions 58, 60, and 62 described above. Though the process for risk-informed the acceptance criteria is the same as the process for risk-informed the analysis methodology, the two processes do not have to be applied together. One methodology may be used across the event spectrum with the results assessed against a varying set of acceptance criteria. Similarly, different methodologies may be used across the event spectrum with the results compared against one constant set of acceptance criteria.

Figure 7:
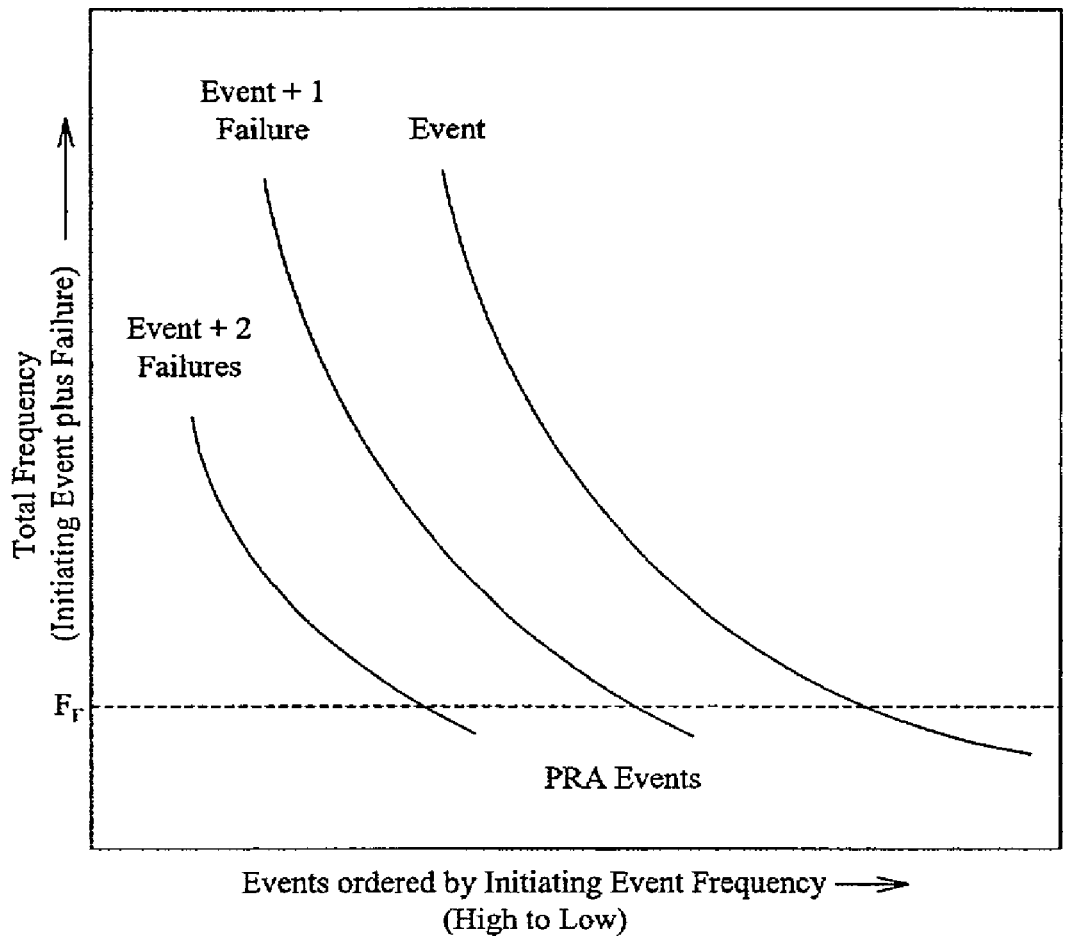
FIG. 7 is a graph of events ordered by an initiating event frequency and showing the additional failures.

Currently, many deterministic safety analyses must also postulate additional system failures that are not a direct consequence of the initiating event itself. Examples of these postulated failures are loss of offsite power to the plant or the failure of a mitigating system to start when demanded. The requirement for postulating the additional failures was included as a means of ensuring that the remaining mitigating systems retained sufficient capacity to mitigate the consequences of the event but this requirement does not have an explicit risk basis. In the exemplary embodiment, the approach for postulating additional failures is risk-informed in a manner similar to that used for risk-informed the other aspects of the deterministic analyses. A total threshold frequency, $F_F$, is defined for the combination of the initiating event frequency and the failure frequency. If the initiating event frequency is less than $F_F$, no additional failures are postulated. If the initiating event frequency alone is above $F_F$, additional failures are postulated, one at a time, until the total frequency (event plus failures) is below $F_F$. This approach is shown in FIG. 7 which is a graph of events ordered by an initiating event frequency and showing the additional failures.

There may be situations where deterministic analyses must be performed for events having initiating frequencies below the threshold value $F_T$. Examples of these situations are analyses required by regulation and demonstrations of defense in depth. In these situations, the PRA acceptance criteria and methods can be used, the acceptance criteria and methodology applied to events just above the threshold value as described above can be used, or a combination of these approaches can be used.

The above described method 40 of risk-informed deterministic safety analyses is applicable to many areas in the nuclear power plant design. Method 40 can be used, for example, to determine the minimum emergency core cooling system performance characteristics required to mitigate the consequences of loss-of-coolant accidents while still maintaining an appropriate degree of safety margin. These performance characteristics can then be used as the basis for developing cost effective maintenance and testing requirements. Method 40 can also be used for addressing material degradation issues for plant life extension and license renewal. Method 40 can be used to determine transient and accident structural load definitions. The resulting risk-informed load definitions are then used to develop the appropriate structural repairs for reactor internals affected by material degradation. The risk-informed load definitions also are used as the basis for expanding the reactor operating range for plants where the range is restricted by overly conservative accident load definitions.

While the invention has been described in terms of various specific embodiments, those skilled in the art will recognize that the invention can be practiced with modification within the spirit and scope of the claims.

The invention claimed is:

1. A risk-informed method for safety analyses of nuclear power generating systems, said method comprising:
    ordering events by an initiating event frequency;
    defining an initiating event frequency threshold value;
    defining acceptance criteria having an adjusted amount of conservatism, wherein the amount of conservatism is a function of the initiating event frequency;
    determining if an event has an event initiating frequency at or above the threshold value;
    determining if an event has an event initiating frequency below the threshold value; and
    determining if a nuclear power generating system meets licensing requirements by:
    analyzing an event by a deterministic safety analysis methodology when the event has an event initiating frequency at or above the threshold value to produce an event analysis result; or
    analyzing an event by a probabilistic risk assessment methodology when the event has an event initiating frequency below the threshold value to produce an event analysis result;
    comparing the event analysis result to the defined acceptance criteria to determine if the nuclear power generating system meets licensing requirements; and
    outputting a comparison result that indicates if the nuclear power generating system meets licensing requirements.

2. A method in accordance with claim 1 further comprising determining an amount of conservatism used in the deterministic safety analysis methodology, wherein the amount of conservatism is a function of the initiating event frequency.

3. A method in accordance with claim 2 further comprising:
    identifying additional system failures that are not a direct consequence of the initiating event;
    defining a total threshold frequency for the combination of the initiating event frequency and the additional failure frequency; and
    adding additional system failures to the safety analysis, one at a time, until a total frequency of an event plus additional failures is less than the total threshold frequency when the initiating event frequency is above the total threshold frequency.

4. A method in accordance with claim 2 wherein determining an amount of conservatism used in the deterministic safety analysis methodology comprises developing at least one deterministic safety analysis methodology containing a predetermined amount of conservatism based on the initiating event frequency, wherein the predetermined amount of conservatism used in a deterministic safety analysis methodology is a function of the difference between the initiating event frequency and the initiating event frequency threshold value.

5. A method in accordance with claim 1 wherein defining acceptance criteria having an adjusted amount of conservatism comprises developing at least one acceptance criteria containing a predetermined amount of conservatism based on the initiating event frequency, wherein the predetermined amount of conservatism for an acceptance criteria is a function of the difference between the initiating event frequency and the initiating event frequency threshold value.

6. A system for performing risk-informed safety analyses of nuclear power generating systems, said system comprising a computer configured to:
   order events by an initiating event frequency;
   define an initiating event frequency threshold value;
   define acceptance criteria having an adjusted amount of conservatism, wherein the amount of conservatism is a function of the initiating event frequency;
   determine if an event has an event initiating frequency at or above the threshold value;
   determine if an event has an event initiating frequency below the threshold value; and
   determine if a nuclear power generating system meets licensing requirements by:
   analyzing an event by a deterministic safety analysis methodology when the event has an event initiating frequency at or above the threshold value to produce an event analysis result; or
   analyzing an event by a probabilistic risk assessment methodology when the event has an event initiating frequency below the threshold value to produce an event analysis result;
   comparing the event analysis result to the defined acceptance criteria to determine if the nuclear power generating system meets licensing requirements; and
   outputting a comparison result that indicates if the nuclear power generating system meets licensing requirements.

7. A system in accordance with claim 6 wherein said computer is further configured to determine an amount of conservatism used in the deterministic safety analysis methodology, wherein the amount of conservatism is a function of the initiating event frequency.

8. A system in accordance with claim 7 wherein said computer is further configured to:
   identify additional system failures that are not a direct consequence of the initiating event;
   define a total threshold frequency for the combination of the initiating event frequency and the additional failure frequency; and
   add additional system failures to the safety analysis, one at a time, until a total frequency of an event plus additional failures is less than the total threshold frequency when the initiating event frequency is above the total threshold frequency.

9. A system in accordance with claim 7 wherein said computer is further configured to develop at least one deterministic safety analysis methodology containing a predetermined amount of conservatism based on the initiating event frequency, wherein the predetermined amount of conservatism used in a deterministic safety analysis methodology is a function of the difference between the initiating event frequency and the initiating event frequency threshold value.

10. A system in accordance with claim 6 wherein said computer is further configured to develop at least one acceptance criteria containing a predetermined amount of conservatism based on the initiating event frequency, wherein the predetermined amount of conservatism for an acceptance criteria is a function of the difference between the initiating event frequency and the initiating event frequency threshold value.

11. A computer program embodied on a computer readable medium for performing risk-informed safety analyses of nuclear power generating systems, said program comprising a code segment that:
   orders events by an initiating event frequency;
   defines an initiating event frequency threshold value;
   defines acceptance criteria having an adjusted amount of conservatism, wherein the amount of conservatism is a function of the initiating event frequency;
   determines if an event has an event initiating frequency at or above the threshold value;
   determines if an event has an event initiating frequency below the threshold value; and
   determines if a nuclear power generating system meets licensing requirements by:
   analyzing an event by a deterministic safety analysis methodology when the event has an event initiating frequency at or above the threshold value to produce an event analysis result; or
   analyzing an event by a probabilistic risk assessment methodology when the event has an event initiating frequency below the threshold value to produce an event analysis result;
   comparing the event analysis result to the defined acceptance criteria to determine if the nuclear power generating system meets licensing requirements; and
   outputting a comparison result that indicates if the nuclear power generating system meets licensing requirements.

12. A computer program in accordance with claim 11 further comprising a code segment that determines an amount of conservatism used in the deterministic safety analysis methodology, wherein the amount of conservatism is a function of the initiating event frequency.

13. A computer program in accordance with claim 12 further comprising a code segment that:
   identifies additional system failures that are not a direct consequence of the initiating event;
   defines a total threshold frequency for the combination of the initiating event frequency and the additional failure frequency; and
   adds additional system failures to the safety analysis, one at a time, until a total frequency of an event plus additional failures is less than the total threshold frequency when the initiating event frequency is above the total threshold frequency.

14. A computer program in accordance with claim 11 further comprising a code segment that develops at least one deterministic safety analysis methodology containing a predetermined amount of conservatism based on the initiating event frequency, wherein the predetermined amount of conservatism used in a deterministic safety analysis methodology is a function of the difference between the initiating event frequency and the initiating event frequency threshold value.

15. A computer program in accordance with claim 11 further comprising a code segment that develops at least one acceptance criteria containing a predetermined amount of conservatism based on the initiating event frequency, wherein the predetermined amount of conservatism for an acceptance criteria is a function of the difference between the initiating event frequency and the initiating event frequency threshold value.

* * * * *